United States Patent

[11] 3,573,370

[72] Inventors Hans Blauert
3 Karntner-Platz, 8 Munich 21;
Ernst Schuhbauer, 6 Prochintalstr, 8
Munich 54, Germany

[21] Appl. No. 807,773
[22] Filed Mar. 13, 1969
[45] Patented Apr. 6, 1971
[32] Priority Mar. 20, 1968
[33] Germany
[31] 4138/68

[54] CIRCUIT ARRANGEMENT FOR THE TRANSMISSION OF TELEGRAPHY AND DATA SIGNALS
2 Claims, 1 Drawing Fig.

[52] U.S. Cl. ........ 178/58, 178/69
[51] Int. Cl. ........ H04l 5/14, H04l 25/08
[50] Field of Search ........ 178/58, 69 (C), 69

[56] References Cited
UNITED STATES PATENTS
1,762,952 6/1930 Bell ........ 178/58

*Primary Examiner*—Kathleen H. Claffy
*Assistant Examiner*—Douglas W. Olms
*Attorney*—Irons, Birch, Swindler & McKie

ABSTRACT: A circuit arrangement for the transmission of telegraphy and data signals at any speed over a line in a direct current transmission system wherein the internal resistances of the transmitters and receivers are mismatched low-ohmically to the line. At least one end station has an internal resistance that is further mismatched extremely low-ohmically to the line.

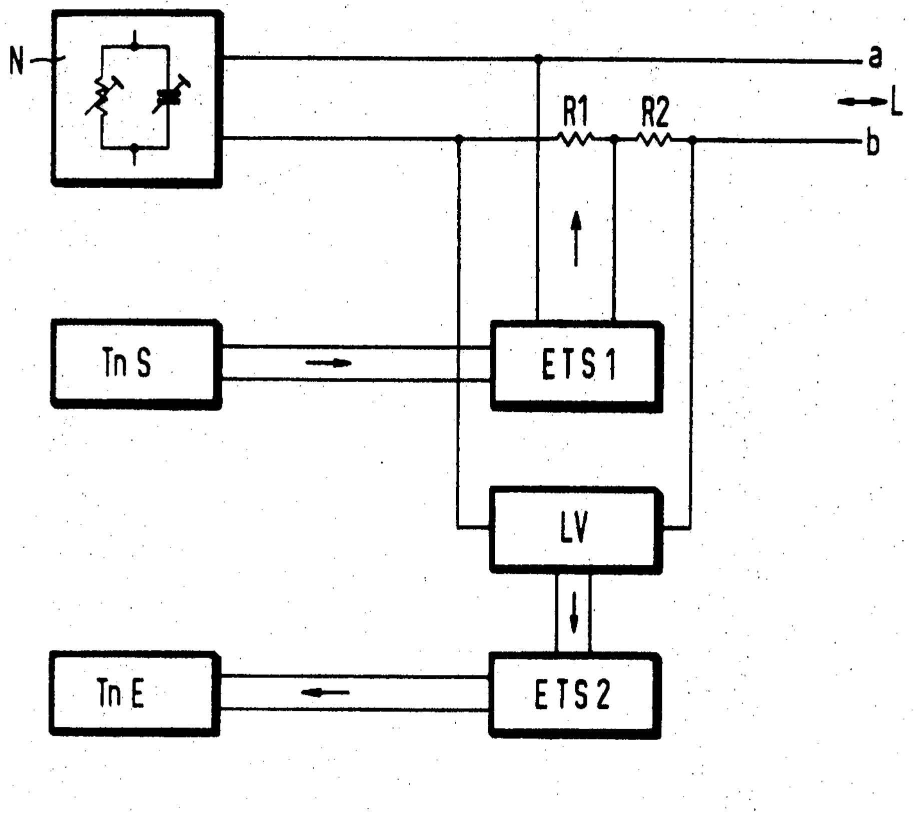
N
a
R1
R2
L
b
Tn S
ETS 1
LV
Tn E
ETS 2

CIRCUIT ARRANGEMENT FOR THE TRANSMISSION OF TELEGRAPHY AND DATA SIGNALS

CROSS REFERENCE TO RELATED APPLICATION

Applicants claim priority from corresponding German application Ser. No. 4.138/68, filed Mar. 20, 1968.

BACKGROUND OF THE INVENTION

1. Field of the Invention

The invention concerns a circuit arrangement for the transmission of telegraphy and data signals at any speed over a direct current transmission system consisting of symmetrical and electrically switched through lines, wherein the internal resistances of the transmitters and receivers are mismatched low-ohmically relative to the lines.

2. Description of the Prior Art

It is known in the telegraph art to transmit individual telegraph steps of signals in the form of direct current pulses. If a cable is used as the line, crosstalk disturbances occur due to the capacitive and inductive coupling existing between individual conductor pairs of the cable. Within the voice frequency band, the crosstalk disturbances increase about proportionally with the transmission speed. As certain conditions must be maintained with regard to the crosstalk disturbances, the transmission speed on lines of this type cannot be selected at will.

To limit the crosstalk disturbances, it is known to select the telegraphy transmission potential so low that the crosstalk disturbances remain below a fixed value. However, with the decrease of the telegraphy transmission potential, distortion increases and special measures are then required in order to arrive at a satisfactory solution in this manner.

For this purpose an arrangement has become known which permits a considerable increase in the telegraphy speed in such a direct current transmission system and still avoids the disadvantages or crosstalk disturbances and distortion. This is achieved by lowering the time constant of the lines. For this purpose the internal resistances of the transmitters and receivers are lowered, relative to the line input and line output resistances, in about the same proportion as the telegraphy speed is increased relative to a fundamental telegraphy speed. Through such a low-ohm mismatch on both sides of the line one can keep the time constant of the line so low that the charging and discharging of the line capacitances associated with a direct current transmission takes place so fast that even the shortest telegraphy steps occurring at very high speed reach the built-up state on the receiver side. The distortions are thereby lessened, or, for equal distortions, transmission over longer conductors becomes possible.

A direct current transmission system operating according to this principle makes possible two-wire duplex operation, four-wire duplex operation or two-wire simplex operation. However such two-wire duplex operation has the disadvantage that the setting of the line balancing network causes great difficulties. Not only must the line balancing network be individually adapted to the line length in each case, but the balancing must be carried out several alternate times at the two end points.

SUMMARY OF THE INVENTION

The object of the invention is to eliminate this disadvantage. In accordance with the invention, the internal resistance of at least one end station is mismatched extremely low-ohmically to the line, independently of the mismatch on both sides.

According to a further development of the invention the internal resistance of the transmitter has a considerably lower value than the input resistance of the receiver. This eliminates a further problem that occurs in a direct current transmission system with low transmitter potential which is that through message connections with high transmitter potential, message connections with low transmitter potential in adjacent conductors of the same circuit are influenced and thereby crosstalk can occur, leading to distortion or complete falsification.

BRIEF DESCRIPTION OF THE DRAWING

The FIG. is a block diagram of the system according to the invention.

DETAILED DESCRIPTION OF THE INVENTION

The FIG. shows transmitter part TnS and receiver part TnE of a subscriber station. Line *L* having conductors *a* and *b* provides two-wire duplex operation between the illustrated subscriber station and a second similarly developed subscriber station (not shown).

The line balancing network is designated N. Electronic telegraphy signal transmitter ETS1 is assigned to transmitter part TnS and electronic telegraphy signal transmitter ETS2 is assigned to receiver part TnE. Amplifier LV is also assigned to receiver part TnE.

According to the invention, the internal resistance of at least one end station is selected to be extremely low-ohmic (independently of the two-sided mismatch) in such a way that the input resistance thereof is fixed. In the FIGURE, the end station functioning as the transmitter station is so selected. In this case, the internal resistance of the transmitter, which is the resistance of electronic telegraphy signal transmitter ETS1, is considerably lower than the internal resistance of the receiver, which is the input resistance of amplifier LV. The resistance of the transmitter, in turn, due to the introductorily explained low-ohmic mismatch to the line, is lower than the wave resistance of the line.

Line balancing network N comprises resistors and capacitors in known manner. The relatively high impedances of the line balancing network are connected in parallel with the low internal resistance of the transmitter. The relatively high internal resistance of the receiver —compared to the internal resistance of the transmitter —is partially connected in series with the impedances of the line balancing network. The input resistance of an end station is thus determined by the low internal resistance of the transmitter. The considerably higher, parallel connected impedances of the line balancing network, however, are negligible. In this manner it is possible to carry out equalization of the line balancings at each of the end stations independently from one another.

The disturbance that results through message connections with high transmission potentials in adjacent conductors of the same cable is also effectively lessened by the invention. Disturbances from adjacent lines are based mainly on disturbance potentials that are capacitively coupled in. If, as disclosed by the invention, the internal resistance on the transmitter side (i.e. the internal resistance of electronic telegraphy signal transmitter ETS1) is lower than the internal resistance on the receiver side (i.e. the internal resistance of amplifier LV), disturbance potentials, the main portion whereof are capacitively coupled in, will be short circuited over the internal resistance on the transmitter side. The receiver part itself is not, or only unsubstantially, influenced thereby.

We claim:

1. A circuit arrangement for the transmission of telegraphy and data signals at any speed over a line in a direct current transmission system wherein the internal resistances of the transmitters and receivers are mismatched low-ohmically to the line comprising at least one end station having an internal resistance that is further mismatched extremely low-ohmically to the line.

2. A circuit arrangement as recited in claim 1 wherein the internal resistance of the transmitter of at least one end station has a considerably lower value than the internal resistance of the receiver of at least one end station.